US009952384B2

(12) United States Patent
Volz et al.

(10) Patent No.: US 9,952,384 B2
(45) Date of Patent: Apr. 24, 2018

(54) OPTICAL DIODE
(71) Applicant: Technische Universitat Wien, Vienna (AT)
(72) Inventors: Jürgen Volz, Vienna (AT); Philipp Schneeweiss, Vienna (AT); Clement Sayrin, Vienna (AT); Arno Rauschenbeutel, Vienna (AT)
(73) Assignee: Technische Universität Wien, Vienna (AT)
( * ) Notice: Subject to any disclaimer, the term of this patent is extended or adjusted under 35 U.S.C. 154(b) by 0 days.
(21) Appl. No.: 15/504,084
(22) PCT Filed: Aug. 18, 2015
(86) PCT No.: PCT/AT2015/000111
§ 371 (c)(1),
(2) Date: Feb. 15, 2017
(87) PCT Pub. No.: WO2016/025970
PCT Pub. Date: Feb. 25, 2016

(65) Prior Publication Data
US 2017/0261686 A1    Sep. 14, 2017

(30) Foreign Application Priority Data
Aug. 18, 2014   (AT) .................... 50573/2014

(51) Int. Cl.
*G02B 6/126* (2006.01)
*G02F 1/095* (2006.01)
*G02B 6/122* (2006.01)
(52) U.S. Cl.
CPC ........... *G02B 6/126* (2013.01); *G02B 6/1226* (2013.01); *G02F 1/0955* (2013.01); *G02F 2202/36* (2013.01)
(58) Field of Classification Search
CPC .................................................. G02F 1/0955
See application file for complete search history.

(56) References Cited

U.S. PATENT DOCUMENTS

| 4,711,525 A | * | 12/1987 | Feth | ........................ | G02B 6/105 |
| | | | | | 385/11 |
| 2015/0185510 A1 | * | 7/2015 | Akira | ...................... | G02F 1/093 |
| | | | | | 359/352 |
| 2015/0261020 A1 | * | 9/2015 | Ju | ............................ | G02B 6/12 |
| | | | | | 385/11 |

FOREIGN PATENT DOCUMENTS

| DE | 2333272 A1 | 1/1974 |
| DE | 202011107213 U1 | 12/2011 |
| WO | 2014034970 A1 | 3/2014 |

OTHER PUBLICATIONS

Mitsch, R. et al., "Exploiting the Local Polarization of Strongly Confined Light for Sub-Micrometer-Resolution Internal State Preparation and Manipulation of Cold Atoms", American Physical Society, Physical Review A 89, 063829 (2014), 6 pages.
Van Parys, Wouter, et al., "Transverse Magnetic Mode Nonreciprocal Propagation in an Amplifying AIGaInAs/InP Optical Waveguide Isolator", American Institute of Physics, Applied Physics Letters 88, 071115 (2006), 4 pages.
Peltzer, J.J., et al., "Plasmonic Micropolarizers for Full Stokes Vector Imaging", Dept. of Physics, Colorado School of Mines, Proc. of SPIE, vol. 8364, 836400 (2012), 12 pages.

* cited by examiner

*Primary Examiner* — Michelle R Connelly
(74) *Attorney, Agent, or Firm* — McKee, Voorhees & Sease, PLC (57) ABSTRACT

An optical diode (1) comprising an optical wave guide for guiding light, preferably of a light mode, with a vacuum wavelength $\lambda_0$, wherein the optical wave guide has a wave guide core (2, 3, 14) with a first index of refraction ($n_1$), and the wave guide core (2, 3, 14) is surrounded by at least one second optical medium which has at least one second index of refraction (n2), wherein $n_1 > n_2$ applies, wherein the wave guide core (2, 3, 14) has at least in sections a smallest lateral dimension (7) which is a smallest dimension of a cross section (6) perpendicular to a propagation direction (5) of the light in the wave guide core (2, 3, 14), wherein the (Continued)

smallest lateral dimension (7) is greater than or equal to $\lambda_0/(5*n_1)$ and less than or equal to $20*\lambda_0/n_1$, wherein the optical diode (1) additionally comprises at least one absorber element (10, 11, 15, 16) which is arranged in a near field, wherein the near field consists of the electromagnetic field of the light of the vacuum wavelength $\lambda_0$ in the wave guide core (2, 3, 14) and outside of the wave guide core (2, 3, 14) up to a standard interval (12) of $5*\lambda_0$, wherein the standard interval (12) is measured starting from one surface (8) of the wave guide core (2, 3, 14) forming an optical interface and in a direction perpendicular to the surface (8). The invention provides that the at least one absorber element (10, 11, 15, 16) for the light of the vacuum wavelength $\lambda_0$ has a strongly different absorption for left circular polarization ($\sigma^-$) and for right circular polarization ($\sigma^+$).

37 Claims, 4 Drawing Sheets

OPTICAL DIODE

CROSS REFERENCE TO RELATED APPLICATIONS

This is a national phase application of PCT/AT2015/000111, filed Aug. 18, 2015 and claims priority to Austrian Application No. 50573/2014, filed on Aug. 18, 2014, each of which is herein incorporated by reference in their entirety.

FIELD OF INVENTION

This invention concerns an optical diode comprising an optical waveguide for guiding light, preferably a light mode, having a vacuum wavelength $\lambda_0$, where the optical waveguide has a waveguide core with a first refractive index $n_1$ and the waveguide core is surrounded by at least one second optical medium, which has at least one second refractive index $n_2$, where $n_1 > n_2$, where the waveguide core has, at least in segments, a smallest lateral measurement, which is a smallest measurement of a cross section normal to a direction of propagation of the light in the waveguide core, where the smallest lateral measurement is greater than or equal to $\lambda_0/(5 \cdot n_1)$ and is less than or equal to $20 \cdot \lambda_0/n_1$, where the optical diode additionally comprises at least one absorber element, which is disposed in a near field, where the near field consists of the electromagnetic field of the light of vacuum wavelength $\lambda_0$ in the waveguide core and outside the waveguide core up to a standard distance of $5 \cdot \lambda_0$, where the standard distance is measured from a surface of the waveguide core that forms an optical interface and is measured in a direction perpendicular to the surface.

PRIOR ART

In the propagation of optical signals in optical waveguides, for example in glass fibers or integrated waveguide structures on chips, again and again one runs up against undesirable signal reflections. This can lead to the signals propagating in the opposite direction from their original direction of propagation and, because of this, distorting the signal source, and/or, as disturbance signals, leading to noise, Moreover, these uncontrolled reflected signals are a danger for various optical components. In particular, lasers and laser diodes, which are often used as signal sources, become functionally damaged by such light, which leads to unstable operation with wavelength and/or performance variations and, in an extreme case, even to destruction of the laser. Because of this, it would be important for many optical applications to realize elements in which light can propagate only in one direction, so that the reflections, which always arise, can be filtered out and do not propagate against the desired direction. Such elements are called optical diodes and sometimes are also known as direction optical waveguides or as optical isolators.

The use of so-called Faraday isolators for implementation of optical diodes is known from the prior art. In these systems a rotation of the polarization of the transmitted light occurs due to the application of a strong magnetic field, i.e., the Faraday effect is utilized. Together with polarization filters, this polarization can be utilized to absorb or redirect the back-reflected signals.

However, for practical applications such systems have a number of disadvantages. Apart from the fact that a strong magnetic field is needed, which can lead to a plurality of Faraday isolators interfering with each other and/or other components situated nearby, one should note above all the poor integratability of this solution. Fiber-integrated solutions are indeed known, but they still require lengths of several centimeters. A possibility for integration into integrated optical circuits, especially in/on chips, or for miniaturization, is not readily apparent.

Moreover, solutions based on Faraday isolators have a strong wavelength dependency or a very narrow bandwidth. In other words, undesired reflections of light whose wavelength deviates even only a little from a given wavelength, cannot be reliably filtered out.

Finally, solutions based on Faraday isolators are expensive.

An optical isolator that comprises a waveguide and a magnetic layer, which is disposed above the waveguide and on it, is known from DE 2333272 A1. The magnetic layer in this case is magnetized parallel to a surface of the waveguide and perpendicular to the direction of propagation of the means of light in the waveguide. Because of the interaction between the magnetic field of the light and the magnetic layer there is a direction of propagation dependent depth of penetration of the lateral intensity distribution into the magnetic layer. Correspondingly, a variously strong absorption of the light in the magnetic layer takes place in dependence on the direction of propagation.

AIM OF THE INVENTION

Therefore, it is the aim of this invention to make available an optical diode that avoids the said disadvantages. In particular, a solution that can be integrated in/on chips or can be miniaturized, which can be bonded directly to optical glass fibers and/or integrated waveguides, is to be created.

NATURE OF THE INVENTION

The essence of the invention is to realize an optical diode which is transparent for light having vacuum wavelength $\lambda_0$ that propagates in a direction, but which exhibits a strong, preferably even adjustable, absorption for light having vacuum wavelength $\lambda_0$ that propagates in the opposite direction, through utilization of the effect of so-called spin-orbit coupling of light, which is called SOCL in what follows. This effect is well documented in the scientific literature, for example, see Konstantin Y. Bliokh et al., "Spin-orbit interactions of light in isotropic media" in "The Angular Momentum of Light" (Eds. David L. Andrews & Mohamed Babiker, Cambridge University Press, 2012; Online ISBN: 9780511795213) or Konstantin Y. Bliokh et al., "Extraordinary momentum and spin in evanescent waves," Nature Communications 5, Article number: 3300, doi: 10.1038/ncomms4300 (2014).

SOCL arises in the propagation of light in a spatially very limited optical waveguide, due to which a solution based on SOCL necessarily leads to a miniaturized solution, which is excellently suitable for integration, in particular for integration in the case of optical tracks disposed on a chip. Spin orbit-coupled light exhibits a correlation of the local circular polarization state of the light (i.e., the photon spin) with the direction of propagation (orbital angular momentum) of the light and/or the position within the beam cross section of the light field. Here the photon spin in the present case of an optical diode according to the invention, with a spatially very limited waveguide, is always perpendicular to a direction of propagation of the light in the waveguide. More precisely, a normal vector in any plane, in which the vector of the electric (or magnetic) field rotates in accordance with the local circular polarization, will always be perpendicular to the direction of propagation of the light in the waveguide.

The light is guided in the waveguide in a waveguide core or an optical medium with a first refractive index $n_1$. The waveguide core is surrounded by at least one second optical medium or the waveguide core is bounded by an optical interface at the at least one second optical medium, which forms a jacket for the waveguide core. The light guided in the waveguide core is not spatially limited to the waveguide core, but rather crosses into the at least one second optical medium (as an evanescent wave). The at least one second optical medium has at least one second refractive index $n_2$, where $n_1 > n_2$. The greater the contrast of the refractive indices, the more pronounced the SOCL effect will be. That is, the optical diode according to the invention is basically not limited to specific materials. In particular, it can therefore be realized via the materials for optical waveguides or optical waveguide cores that are already very common, for example Si, GaAs, glass or quartz glass, $SiO_2$.

Because of the SOCL effect, the light field is, for example, right-circularly polarized at some places, whereas in the case in which the light propagates in the opposite direction a left-circular polarization state arises at the same point. This effect is observed in the near field of the optical waveguide or waveguide core, which highly compresses the light guided in it laterally due to its restrictive lateral dimensioning. In this case "lateral" means across the direction of propagation of the light in the optical waveguide. Optimal results for the SOCL effect are achieved by choosing the dimensioning of the waveguide core so that a smallest lateral measurement of the waveguide core is greater than or equal to $\lambda_0/(5 \cdot n_1)$ and smaller than or equal to $20 \cdot \lambda_0/n_1$. The lower limit guarantees sufficient transmission of the waveguide or waveguide core. Besides sufficiently strong development of the SOCL effect, the upper limit also guarantees good focusing and thus coupling of the guided light field at absorber elements disposed in the near field. Said coupling would only be very small in the case of waveguide cores that were laterally still larger, because of the correspondingly larger lateral extent of the guided light modes. It should be noted here that, because of the limit value $20 \cdot \lambda_0/n_1$, it may also be that not just one single light mode or a basic or fundamental mode is guided in the waveguide, which, however, is not a problem for the basic functioning of the optical diode according to the invention. That is, the optical diode according to the invention can basically also be operated in a multimode mode.

The specific design of the cross section of the optical waveguide does not play a role here. It can, for example, be angular, in particular rectangular, or, for example, round, in particular circular or ellipsoidal.

"In the near field" means in the region of a surface of the waveguide core that forms an optical interface, which separates (in the lateral direction) an optically thicker medium (waveguide core) from an optically thinner medium (the at least one second medium). More precisely, "near field" in the sense of the current invention is understood to mean the electromagnetic field of the light of vacuum wavelength $\lambda_0$ in the waveguide core and outside the waveguide core up to a standard distance of $5 \cdot \lambda_0$, where the standard distance is measured from the surface of the waveguide core and perpendicular to it.

If one now positions polarization-dependent absorber elements in the near field, then in each case according to the direction of travel in the waveguide the light is differently polarized at the point of the relevant absorber element— once left-circularly and once right-circularly. Thus, a different absorption occurs in the forward and back directions, and an optical diode is obtained. The above definition of "near field" guarantees a still sufficiently strong intensity of the light of vacuum wavelength $\lambda_0$ in the waveguide core and also outside the waveguide core up to the specified standard distance, where the light is present in the latter region as an evanescent wave whose intensity decreases exponentially with the standard distance. In this way it is guaranteed that there will be a sufficiently high coupling between the light of vacuum wavelength $\lambda_0$ and the absorber elements. In each case according to the polarization of the light at the position of the relevant absorber element there will be, therefore, an absorption that reduces the optical power of the light of vacuum wavelength $\lambda_0$ that is guided overall through the waveguide by an amount that is characteristic for the relevant absorber. "Optical power" here is understood to mean the integral of the intensity of the propagating light field over its cross-sectional area. For the interaction, or coupling, of the light field with an absorber element placed at a specific point the intensity of the light field at said point is, among others, of decisive importance.

The strength of the absorption overall and the bandwidth of the optical diode, i.e., the wavelength interval in which the functionality of the diode is ensured, can be adjusted through the choice of the kind of absorber elements and by varying the number of absorber elements. In this case the positioning of the absorber elements plays a role to the extent that they are positioned as advantageously as possible so that they are disposed in a region in which the light propagating in the waveguide, or the light mode propagating in the waveguide, is as completely circularly polarized as possible.

Here the development of the local circular polarization can be specified still more precisely, as follows. Usually, transversally polarized modes are transported in waveguides. Due to the tight lateral dimensions of the waveguide core of the optical diode, light is basically guided in a hybrid polarized state, which exhibits both transversal and longitudinal components of polarization in the waveguide or waveguide core. What is relevant for the functioning of the optical diode according to the invention are light fields with quasi-linear polarization state, which automatically result when linearly polarized light, as is usually used in current glass fiber networks, is guided through an optical waveguide with a laterally tightly measured waveguide core. The optical diode according to the invention therefore comprises a waveguide that is designed so that it is suitable for conducting quasi-linearly polarized light having vacuum wavelength $\lambda_0$.

"Quasi-linearly polarized" means that basically a main polarization plane exists that is perpendicular to the direction of propagation and oscillates transversely in the two components of the vector of the electric field. In addition, there is a component of the electric field that is not transversal, but rather longitudinal, which however is phase-shifted relative to the transversal component by 90°, due to which circularly polarized light results in the region of the optical interface. Since the longitudinal component is greatest in the main polarization plane for optimum absorption the absorber elements must be disposed in the main polarization plane as far as possible.

Therefore, in the case of an optical diode comprising an optical waveguide for guiding light, preferably a light mode, having a vacuum wavelength $\lambda_0$, where the optical waveguide has a waveguide core having a first refractive index $n_1$ and the waveguide core is surrounded by at least one second optical medium, which has at least one second refractive index $n_2$, where $n_1 > n_2$, it is provided according to the invention that the waveguide core have, at least in segments, a smallest lateral measurement, which is a smallest measurement of a cross section normal to a direction of propagation of the light in the waveguide core, where the smallest lateral measurement is greater than or equal to $\lambda_0/(5 \cdot n_1)$ and less than or equal to $20 \cdot \lambda_0/n_1$, that the optical diode further comprises at least one absorber element, which is disposed in a near field, where the near field consists of the electromagnetic field of the light having vacuum wavelength $\lambda_0$ in the waveguide core and outside the waveguide core up to a standard distance of $5 \cdot \lambda_0$, where the standard distance is measured from a surface of the waveguide core that forms an optical interface and in a direction perpendicular to the surface, and that the at least one absorber element for the light having vacuum wavelength $\lambda_0$ exhibits absorption of different strength in the case of left-circular polarization on the one hand and in the case of right-circular polarization on the other.

A device with such structure can therefore be used as optical diode. It should be noted that the at least one absorber element according to the given definition of the term "near field" in the sense of the current invention does not necessarily have to be disposed outside of the optical waveguide, but rather can also be positioned in the optical waveguide.

When the discussion concerns light having or of the vacuum wavelength $\lambda_0$, it is understood that said light will, in the waveguide core and/or at the site of the at least one absorber element, in general have a wavelength $\lambda$ that is smaller than and different from $\lambda_0$—in each case according to the magnitude of the refractive index of the waveguide core or the at least one second optical medium, in which the at least one absorber element is situated.

Usually, a single absorber element is able to attenuate the optical power of the light or the light mode in the waveguide only by a certain amount or fraction, so that complete absorption does not occur. This makes it possible to vary the magnitude of the absorption through the entire diode by providing a plurality of absorber elements. In each case according to the size or magnitude of the absorption by a single absorber element the variation of the strength of absorption by the overall optical diode can take place in steps (in the case of relatively strong absorption by a single absorber element) up to quasi-continuously (with very small or weak absorption by a single absorber element). Correspondingly, it is foreseen in a preferred embodiment of the optical diode according to the invention that a plurality of absorber elements is provided.

Because of the said lateral dimensions of the optical waveguide the optical diode according to the invention is ideally suitable as part of an integrated optical circuit on a chip, in particular for applications in nanooptics or nanophotonics. Especially in the assembly of such integrated optical circuits the optical waveguide core can be made as an optical track on a substrate, for example on a photonic Si chip or an $SiO_2$ substrate. Such optical tracks can be made with current lithographic methods and very common materials, for example glass, quartz glass, Si, GaAs, etc. Correspondingly, it is intended in the case of a preferred embodiment of the optical diode according to the invention that the optical waveguide is disposed on a substrate.

As already established, the contrast of the refractive indices of the waveguide core and the substrate affect the SOCL effect and thus the performance of the optical diode. The following compilation of materials for the waveguide core on the one hand and the substrate on the other is intended to illustrate this for a certain combination of light of the vacuum wavelength $\lambda_0$ and a certain kind of exactly one absorber element. Here $A_f$ is the absorption coefficient of the absorber element for a forward running mode, i.e., when the optical diode is operated in the forward direction. $A_b$ designates the absorption coefficient of the absorber element for a backward running mode, i.e., when the optical diode is operated in the opposite or blocking direction. The absorption coefficient is generally defined via the ratio of optical power scattered or absorbed by the absorber element divided by the optical power of the incoming light field. The ratio of the absorptions, or $A_b/A_f$, can be calculated independent of the number of absorber elements and at the same time independent of the specific coupling of the absorber element to light or light mode:

a) $n_1/n_2 = 1.53/1.45$ ($SiO_2/SiO_2$, but differently doped): $A_b/A_f = 3.8$
b) $n_1/n_2 = 1.45$ (glass/air): $A_b/A_f = 39$
c) $n_1/n_2 = 3/1.45$ (Si/$SiO_2$): $A_b/A_f = 227$
d) $n_1/n_2 = 3.5/1.45$ (GaAs/$SiO_2$): $A_b/A_f = 452$
e) $n_1/n_2 = 1.45/1.38$ ($SiO_2$/magnesium fluoride): $A_b/A_f = 3.5$
f) $n_1/n_2 = 1.45/1.34$ ($SiO_2$/Cytop): $A_b/A_f = 5$ The current lithographic production methods usually consist of the exposure of a photovarnish (also called photoresist) to light followed by an etching step. Waveguide structures or waveguide cores that are at least partially recessed in the substrate can be generated in this way. On the one hand, in this way the contrast of the refractive indices between waveguide core and substrate can be utilized over a large region of the waveguide core. On the other hand, recessing the waveguide core to a desired depth enables the positioning of absorber elements at a desired level with respect to a vertical direction of the waveguide core, where the vertical direction is perpendicular to a substrate surface. For this the surface elements only have to be disposed on the substrate next to the waveguide core. Therefore, it is provided in a preferred embodiment of the optical diode according to the invention that the waveguide core is recessed at least in segments in the substrate. "In segments" can in this case refer both to the vertical direction of the waveguide core and to a lengthwise direction of the waveguide core or to the direction of propagation of the light in the waveguide core.

Many different means are possibilities as absorber elements. For example, so-called quantum dots can be disposed in the near field as absorber elements, which can be achieved, for example, by molecular beam epitaxy. Such quantum dots are well known from the literature, for example see Jan Dreiser et al., "Optical investigations of quantum dot spin dynamics as a function of external electric and magnetic fields," Physical Review B 77, 075317 (2008), where studies on InAs/GaAs quantum dots are described. In particular, singly charged quantum dots are suitable absorber elements, since they have different resonance frequencies for right-circularly polarized light and left-circularly polarized light. If, therefore, for example, left-circularly polarized light of a certain wavelength is resonantly absorbed by such a quantum dot, that quantum dot will not in general resonantly absorb right-circularly polarized light of the same wavelength.

Since the polarization of the light guided in the waveguide or waveguide core at a point in the near field is dependent on the direction of propagation of the light, when such a quantum dot is used as absorber element there will be a direction-dependent absorption. That is, an optical diode is present. This is why it is provided in a preferred embodiment of the optical diode according to the invention that at least one, preferably singly charged, quantum dot is provided as the at least one absorber element.

In order to enable simple production of the optical diode, it is provided in a preferred embodiment of the optical diode according to the invention that the at least one quantum dot is disposed outside of the waveguide core.

In order to be able to set or establish overall the strength of absorption of the optical diode, it is provided in a preferred embodiment of the optical diode according to the invention that a plurality of quantum dots is provided, where the quantum dots are disposed parallel to the direction of propagation.

In order to increase the bandwidth of the optical diode, it is provided in a preferred embodiment of the optical diode according to the invention that the plurality of quantum dots comprises quantum dots that exhibit a differently strong absorption for light of different wavelength in the case of left-circular polarization on the one hand and right-circular polarization on the other. Quantum dots that differ in this way or that have correspondingly different resonance frequencies can be generated, for example, by varying their chemical structure and/or geometric form and/or an acting mechanical stress in a targeted way. In addition, as will be described in more detail below, in the case of selected quantum dots or selected assemblies of quantum dots their resonance frequencies can be varied in a targeted way through the application of local electric and/or magnetic fields.

In particular, it is provided in an especially preferred embodiment of the optical diode according to the invention that a resulting interval of wavelengths, in which the differently strong absorption arises, has a width that is greater than 1 nm, preferably greater than or equal to 10 nm, especially preferably greater than or equal to 30 nm. The relevant interval, or the bandwidth, of the diode can be determined in the specific application, where even narrower bandwidths, for example around 0.5 nm, or still much larger bandwidths, for example around 50 nm, can be realized.

In addition or alternatively, it is also possible to use foreign atoms as absorber elements, which resonantly absorb left-circularly and right-circularly polarized light of a certain wavelength with different strength. By integrating these foreign atoms into the waveguide core, one automatically guarantees that these absorber elements will be situated in the near field in every case. Therefore. it is provided in a preferred embodiment of the optical diode according to the invention that foreign atoms are provided in the waveguide core as absorber elements. As a rule, these atoms form atomic impurities in the waveguide core.

An especially simple production results for waveguide cores made of semiconductor materials. In this case doping atoms can be provided as foreign atoms. Thus, in the production process, basically speaking, a large number of quite varied and well-known methods for producing doped semiconductors can be employed. Therefore, it is provided in an especially preferred embodiment of the optical diode according to the invention that the waveguide core consists of a semiconductor material and the foreign atoms are doping atoms for the semiconductor material.

In particular, the semiconductor material of the waveguide core can be silicon. In this case the foreign atoms can preferably be boron atoms.

The difference of the strength of absorption of right-circularly and left-circularly polarized light in the quantum dots and foreign atoms indicated as examples is based on the stimulation of different electronic energy levels of the relevant absorber element. In such absorber elements, as already noted, the difference of the strength of absorption of right-circularly and left-circularly polarized light can be varied by exposing the absorber elements to a magnetic field. This is well known from the scientific literature. For an example for atoms exposed to magnetic fields one may refer to Solomon Zwerdling et al., "Zeeman Effect of Impurity Levels in Silicon," Physical Review 118, 975 (1960). For quantum dots in magnetic fields one may refer for examples to the following, already mentioned work: Jan Dreiser et al., "Optical investigations of quantum dot spin dynamics as a function of external electric and magnetic fields," Physical Review B 77, 075317 (2008). Therefore, it is provided in a preferred embodiment of the optical diode according to the invention that means for generating at least one magnetic field at the position of the at least one absorber element are provided in order to increase the difference between the strength of absorption of left-circularly polarized light of the vacuum wavelength $\lambda_0$ by the at least one absorber element and the strength of absorption of right-circularly polarized light of the vacuum wavelength $\lambda_0$ by the at least one absorber element.

The variation is achieved essentially by the fact that the applied magnetic field increases the split of the resonance frequencies for the relevant resonant absorption of left-circularly and right-circularly polarized light. This opens the possibility of increasing the bandwidth of the optical diode through the application of different magnetic fields. For this reason it is provided in a preferred embodiment of the optical diode according to the invention that at least one magnetic field is formed so that different parts of the plurality of absorber elements are exposed to magnetic fields of different strengths. This can be guaranteed by simply disposing the absorber elements at different distances from the means that generate a magnetic field. Or, spatially distributed means that generate magnetic fields of different strengths can be provided.

The at least one magnetic field can be generated in a simple way, for example by means of a current. For this reason it is provided in a preferred embodiment of the optical diode according to the invention that at least one electric conductor, through which current can be conducted to generate the at least one magnetic field is provided.

The at least one electric conductor can be integrated, in particular on and/or in a substrate, in a simple and substantially known way. For example, the production of copper tracks on and in various substrates is well known. The arrangement in the substrate can also take place only in segments, so that only a part of the at least one electric conductor is disposed in the substrate and a part is on the substrate. Likewise, the at least one electric conductor—analogous to the waveguide core—can also be recessed into the substrate only in segments. For this reason in an especially preferred embodiment of the optical diode according to the invention it is provided that the at least one electric conductor is disposed at least in segments on and/or in a substrate.

Another substantially known means, which can be used alternatively or additionally for generation of the at least one magnetic field, can be permanent magnets. For this reason it is provided in a preferred embodiment of the optical diode according to the invention that at least one permanent magnet is provided in order to generate the at least one magnetic field.

Like the electric conductor, the at least one permanent magnet can also be disposed on and/or in the substrate. The arrangement in the substrate can also take place only in segments, so that only a part of the at least one permanent magnet is disposed in the substrate and a part is disposed on the substrate. Likewise, the at least one permanent magnet, analogous to the waveguide core, can also be recessed in the substrate only in segments. For this reason it is provided in an especially preferred embodiment of the optical diode according to the invention that the at least one permanent magnet is disposed at least in segments on and/or in the substrate.

In particular when foreign atoms are used as absorber elements, but also when quantum dots, for example, are used as absorber elements, there is the possibility of using a so-called imaginary magnetic field, where imaginary magnetic fields are substantially known from the scientific literature, for example see Claude Cohen-Tannoudji and Jacques Dupont-Roc, "Experimental Study of Zeeman Light Shifts in Weak Magnetic Fields," Physical Review A 5, 968 (1972). Here a non-resonant light beam can lead to a shift of energy levels—completely analogous to the effect of a classic magnetic field. Through the choice of the strength or intensity and the polarization state of the non-resonant light beam the strength of the imaginary magnetic field can be selected or varied. This thus results in the elegant possibility of utilizing the waveguide of the optical diode not merely to guide the desired light having vacuum wavelength $\lambda_0$, but rather also to guide the non-resonant light, which serves to generate the imaginary magnetic field. Here the non-resonant light has a vacuum wavelength $\lambda'$, where $\lambda' \neq \lambda_0$. In principle one need only ensure that the absorber elements are in a near field which consists of the electromagnetic field of the non-resonant light having vacuum wavelength $\lambda_0$ in the waveguide core and outside the waveguide core up to a standard distance of $5 \cdot \lambda'$. It should be mentioned that the non-resonant light can naturally be again filtered out subsequently, for example by means of a dichroitic filter. It should further be mentioned that the imaginary magnetic field or the non-resonant light for generation of the imaginary magnetic field can be used alternatively or in addition to the other means for generation of the at least one magnetic field. For this reason it is provided in a preferred embodiment of the optical diode according to the invention that the at least the one magnetic field is a so-called imaginary magnetic field, where, for generation of the imaginary magnetic field in the optical waveguide, guided light having a vacuum wavelength $\lambda'$ is provided, where $\lambda' \neq \lambda_0$, and the at least one absorber element is disposed in another near field, said additional near field consisting of the electromagnetic field of the light having vacuum wavelength $\lambda'$ in the waveguide core and outside the waveguide core up to a standard distance of $5 \cdot \lambda'$.

In each case according to application, different field strengths of the at least one magnetic field can be realized. In particular, this can also take place dynamically, i.e., the different transmission of the optical diode in the permitted direction and the blocking direction and the bandwidth of the optical diode can be dynamically varied. Correspondingly, it is provided in a preferred embodiment of the optical diode according to the invention that the at least one magnetic field is variable at the position of at least one absorber element and preferably, at least timewise, amounts to 1 T, preferably at least 3 T, especially preferably at least 5 T. It goes without saying that in each case according to application, clearly smaller magnetic field strengths, for example from 0.1 T inclusive up to 0.5 T inclusive, or clearly greater magnetic field strengths, for example at least 7 T or at least 10 T, can also be generated, at least timewise, at the position of at least one absorber element.

In the case of constant magnetic fields high magnetic field strengths can also be generated in a simple way by means of known permanent magnets, for example ones based on NdFeB magnets, where the distance between the relevant absorber element and the permanent magnet is to be kept correspondingly small. In the case of magnetic fields that vary over time high magnetic fields can be generated at least briefly by correspondingly high currents in at least one electric conductor. Here, too, the distance between the at least one electric conductor and the relevant absorber element plays a decisive role.

The following general example is intended to illustrate that even high field strengths of the imaginary magnetic field can be generated. For a cesium atom in vacuum, which is 100 nm from a glass fiber having a diameter of 500 nm, a quasi-linearly polarized guided light field that has a vacuum wavelength $\lambda'$ of 880 nm and an optical power of 1 mW, generates, at the site of the atom, an imaginary magnetic field having a strength of about 2 mT. For an optical power of 1 W the imaginary magnetic field would be calculated to be about 2 T. Moreover, the strength of the imaginary magnetic field can be dynamically adjusted by varying the intensity of the light of vacuum wavelength $\lambda'$.

Furthermore, in the case of the quantum dots and foreign atoms as absorber elements that were mentioned as examples their working point can be varied by means of the substantially known Stark effect, see for example Chapter 8.2 in F. Bassani et al., "Electronic impurity levels in semiconductors," Reports on Progress in Physics 37, 1099 (1974) or E. Anastassakis, "Stark Effect on Impurity Levels in Diamond," Physical Review 186, 760 (1969). That means that by application of an electric field one can establish at which wavelength an absorption of light of a specific polarization—and thus a different absorption for differently circularly polarized light of said wavelength $\lambda$—takes place. Moreover, in this way the bandwidth of the optical diode can be established by application of different electric fields at different points of a plurality of absorber elements. Correspondingly, it is provided in a preferred embodiment of the optical diode according to the invention that means are provided for generation of at least one electric field at the position of the at least one absorber element in order to change the value of the wavelength $\lambda$ at which the at least one absorber element differently absorbs left-circularly polarized light and right-circularly polarized light.

Suitable means for generation of the electric field are substantially known electrodes, preferably made of metal, on which a constant or variable voltage is applied. In the case of a substrate that is present the electrodes can be disposed on and/or in the substrate. The production of such electrodes can take place in a substantially known way, where in this connection one is referred to the known production of copper traces on various substrates.

It can be dynamically adjusted for which light of vacuum wavelength $\lambda_0$ the optical diode optionally functions by varying the electric field. On the other hand, the bandwidth of the optical diode can also be dynamically varied in this way. Correspondingly, it is provided in an especially preferred embodiment of the optical diode according to the invention that the at least one electric field at the position of at least one absorber element is variable.

Another possibility for suitable absorber elements of the optical diode according to the invention consists of plasmonic nanostructures, which are substantially known from the scientific literature, for example see Mark I. Stockman, "Nanoplasmonics: past, present, and glimpse into future," Optics Express 19, 22029 (2011) or Paolo Biagioni et al., "Nanoantennas for visible and infrared radiation," Reports on Progress in Physics 75, 024402 (2012) or Justyna K. Gansel et al., "Gold Helix Photonic Metamaterial as Broadband Circular Polarizer," Science 325, 1513 (2009) or Do-Hoon Kwon et al., "Optical planar chiral metamaterial designs for strong circular dichroism and polarization rotation," Optics Express 16, 11802 (2008). These are electrically conducting nanostructures whose dimensions have been selected so that all dimensions of the relevant plasmonic nanostructure are clearly smaller than the vacuum wavelength $\lambda_0$ of the light guided in the waveguide. The plasmonic nanostructures can be used as absorber elements alternatively or in addition to the already mentioned absorber elements. Correspondingly, it is provided in a preferred embodiment of the optical diode according to the invention that as absorber element at least one plasmonic nanostructure is provided, the greatest measurement of which is smaller than the vacuum wavelength $\lambda_0$ of the light guided in the optical waveguide.

Such plasmonic nanostructures can be made, in particular on a substrate, in a substantially known way, for example by means of lithographic processes. Preferably these plasmonic nanostructures are made of metal. Correspondingly, it is provided in a preferred embodiment of the optical diode according to the invention that the at least one plasmonic nanostructure is made of metal, preferably gold.

In order to increase the difference in the strength of absorption of left-circularly polarized light and right-circularly polarized light by the plasmonic nanostructures, it is provided in a preferred embodiment of the optical diode according to the invention that the at least one plasmonic nanostructure have the form of a spiral, at least in segments. The helicity, or the direction of rotation, of the spiral establishes the polarization of the light that will be preferably absorbed. If the helicity of the spiral corresponds with the circular polarization of the light at the site of the plasmonic nanostructure, there will be a stronger absorption than for light whose circular polarization is opposite to the helicity of the spiral structure.

As follows from the above, the absorption or transmission of the optical diode can be tailored for the relevant application. Correspondingly, it is provided in a preferred embodiment of the optical diode according to the invention that the optical diode is designed so that the optical diode is essentially transparent for light having vacuum wavelength $\lambda_0$ in a specified direction of propagation and absorbs at least 50%, in particular at least 75%, preferably at least 90%, especially preferably at least 99% of the optical power of the light having vacuum wavelength $\lambda_0$ in a direction opposite to the direction of propagation. "Essentially transparent" in this case means transparent up to unavoidable losses of the optical power due to the conduct of the light in the physical waveguide or waveguide core.

As already established, the optical diode according to the invention is ideally suitable for integration into integrated optical circuits. According to the invention, therefore, an integrated optical circuit comprising an optical diode according to the invention is provided.

BRIEF DESCRIPTION OF FIGURES

The invention will now be explained in more detail by means of embodiment examples. The figures are exemplary and are intended to present the ideas of the invention, but not in any way to limit it or even to present it in a final way. For clarity the drawings are not true to scale, Here.

WAYS TO IMPLEMENT THE INVENTION

Figure 1A:
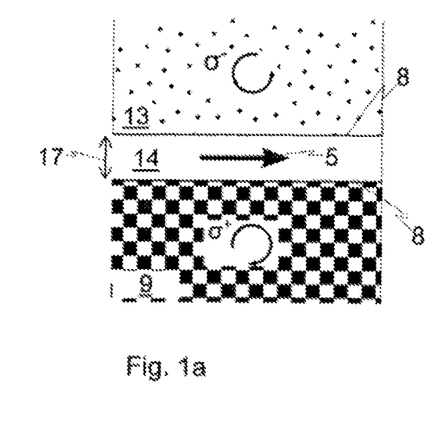
FIG. 1a is an illustration of the SOCL principle in the propagation of light in a direction of propagation in a waveguide disposed on a substrate.

FIG. 1a shows an illustration of the SOCL principle in the propagation of light in a waveguide core 14 disposed on a substrate 9 in a direction of propagation 5. The light is quasi-linearly polarized with a primary polarization component 17, which in this example lies in the plane of the drawing and is perpendicular to the direction of propagation 5. The waveguide core 14 has a refractive index $n_1$. The waveguide core 14 is surrounded on one side by substrate 9 and on the other by air 13, and both the substrate 9 and air 13 have refractive indices that are smaller than $n_1$. The light being guided penetrates both into the air 13 and into the substrate 9 and is present there in each case as an evanescent wave. The intensity of the relevant evanescent wave diminishes exponentially with the distance to a surface 8 of the waveguide core 14, where the surface 8 forms an optical interface between waveguide core 14 and substrate 9/air 13.

Because of the small lateral measurements of the waveguide core 14 the SOCL effect arises, which is expressed in that local circular polarization of the light occurs in the near field. This circular polarization is dependent on the direction of propagation 5 of the light. In FIG. 1a the direction of propagation 5 runs from left to right. The evanescent wave propagating in the air 13 therefore has a nearly complete left-circularly polarization $\sigma^-$, for example, near the surface. On the opposite of the waveguide core 14 the evanescent wave propagating in substrate 9 has exactly the opposite polarization near surface 8, in this example therefore a nearly complete right-circularly polarization $\sigma^+$.

Figure 1B:
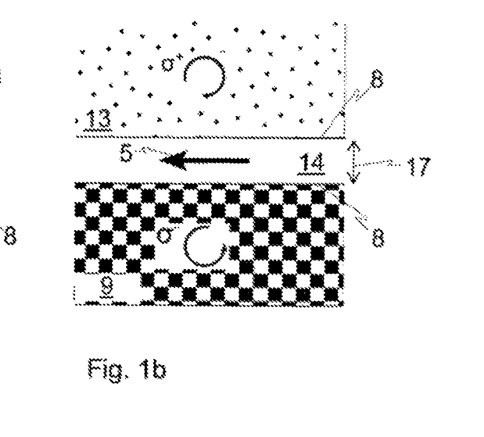
FIG. 1b is a representation analogous to FIG. 1a, but with opposite direction of propagation of the light.

If the direction of propagation 5 is reversed, the local circular polarization caused by the SOCL effect also is reversed. This is illustrated in FIG. 1b, where a direction of propagation 5 opposite to that in FIG. 1a is shown. Correspondingly, the evanescent wave propagating in the air 13 near the surface 8 has a nearly completely right-circular polarization $\sigma^+$ and the evanescent wave propagating on the opposite side of the waveguide core 14 in substrate 9 near the surface 8 has a nearly completely left-circular polarization $\sigma^-$.

Figure 2A:
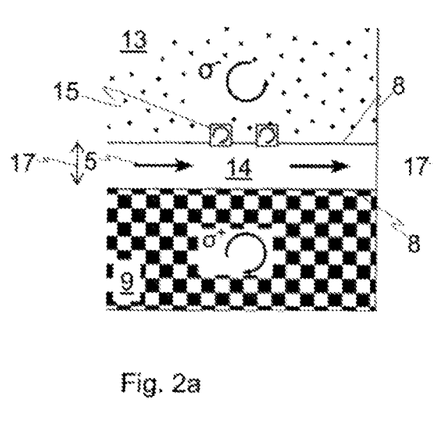
FIG. 2a is a schematic sketch of an optical diode according to the invention, where light propagates in a direction of propagation.

FIG. 2a now shows an optical diode according to the invention, whose structure differs from that shown in FIGS. 1a and 1b only in that near the surface on the side of the waveguide core 14 turned toward the air 13 there are absorber elements 15, which essentially exclusively absorb right-circularly polarized light. Based on the direction of propagation 5 selected in FIG. 2a, which corresponds with the direction of propagation 5 in FIG. 1a, locally a nearly complete left-circular polarization σ' of the light is present in the region of the near field in which the absorber elements 15 are disposed. Consequently no absorption takes place, and after passing the absorber elements 15 the light has essentially the same optical power as before passing absorber elements 15. This is illustrated by the two arrows pointing in the direction of propagation 5, which were essentially of the same size.

Figure 2B:
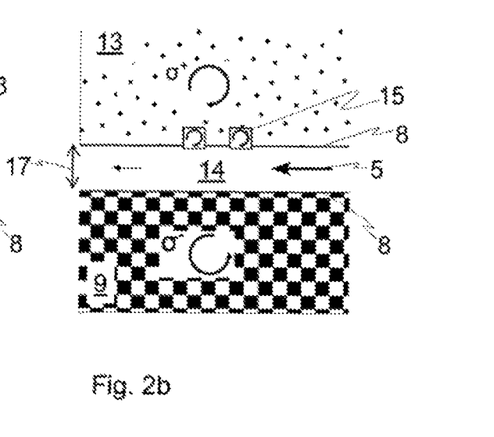
FIG. 2b is a representation analogous to FIG. 2a, but with the opposite direction of propagation of the light.

The optical diode in FIG. 2b has exactly the same structure as in FIG. 2a, but in this case the direction of propagation 5 runs the opposite way. Consequently, a reversed polarization is now present at the positions of the absorber elements 15, i.e., in the region of the near field in which the absorber elements 15 are positioned, the light has a nearly complete right-circular polarization σ⁺. Therefore, an absorption occurs, where each absorber element 15 reduces the overall optical power of the light guided in the waveguide, or in the optical diode 1, by a certain fraction. Overall, therefore, the light guided in the diode 1 has a lower optical power after passing the absorber elements 15 than before passing the absorber elements 15. This is indicated in FIG. 2b by the difference in sizes of the arrows pointing in direction of propagation 5.

Figure 3:
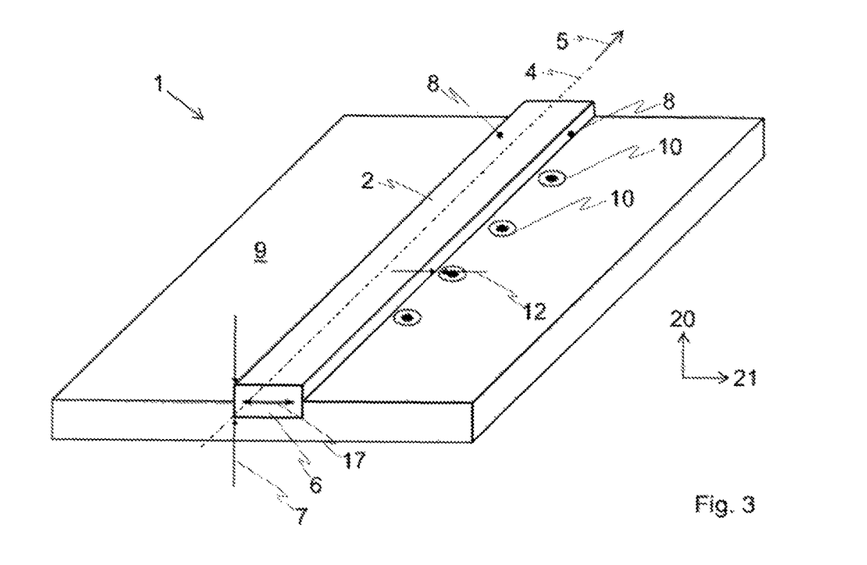
FIG. 3 is a schematic axonometric view of an optical diode according to the invention with quantum dots as absorber elements.

FIG. 3 shows a concrete embodiment having a GaAs waveguide core 2, which is recessed in substrate 9, which can consist, for example, of $SiO_2$. Perpendicular to its lengthwise direction 4, the waveguide core 2 has a rectangular cross section 6, which extends along a vertical direction 20 and a transverse direction 21 of the waveguide core 2. The vertical direction 20 in the example shown is perpendicular to a substrate surface. Along the vertical direction 20 the cross section 6 has its smallest dimension, which defines the smallest lateral dimension 7 of the waveguide core 2. The main polarization component 17 of the light guided in the waveguide core 2 runs parallel to the transverse direction 21. In the case of light whose vacuum wavelength $\lambda_0$ lies in the infrared region in which it is intended to pass through the optical diode 1, the dimension of the cross section 6 in the transverse direction 21 can be, for example, about 100 nm.

Quantum dots 10, which have different absorption for left- and right-circularly polarized light of a specific wavelength λ, are provided as absorber elements. The quantum dots 10 are disposed so that they are in the near field of the light guided in wave [guide] core 2, which has a vacuum wavelength $\lambda_0$. This is achieved because a standard distance 12 between the surface 8 and the individual quantum dots 10 is less than $5 \cdot \lambda_0$.

In substrate 9, the quantum dots 10 are disposed at half the height of the waveguide core 2 in the vertical direction in order to enable optimum coupling of the quantum dots 10 to the near field. In each case according to whether the light in waveguide core 2 propagates in the indicated direction of propagation 5 or in the opposite direction, opposite circular polarization of the light at the site of the quantum dots 10 occurs. Correspondingly, the quantum dots 10 absorb the light in dependence on its direction of propagation 5 to a different degree/. The strength of absorption can be about 15% for a quantum dot 10, for example, in the case of a waveguide core 2 with a width of about 100 nm, a standard distance 12 between the quantum dot 10 and the surface 8 of about 50 nm and for light having a vacuum wavelength $\lambda_0$ of 920 nm.

By varying the number of absorber elements or quantum dots 10 the strength of absorption of the optical diode in the blocking direction can be varied. Furthermore, through the choice of different quantum dots 10 the bandwidth of the optical diode can be varied in that the different quantum dots 10, for different wavelengths λ, have differently strong absorption for left- and right-circularly polarized light.

Figure 4:
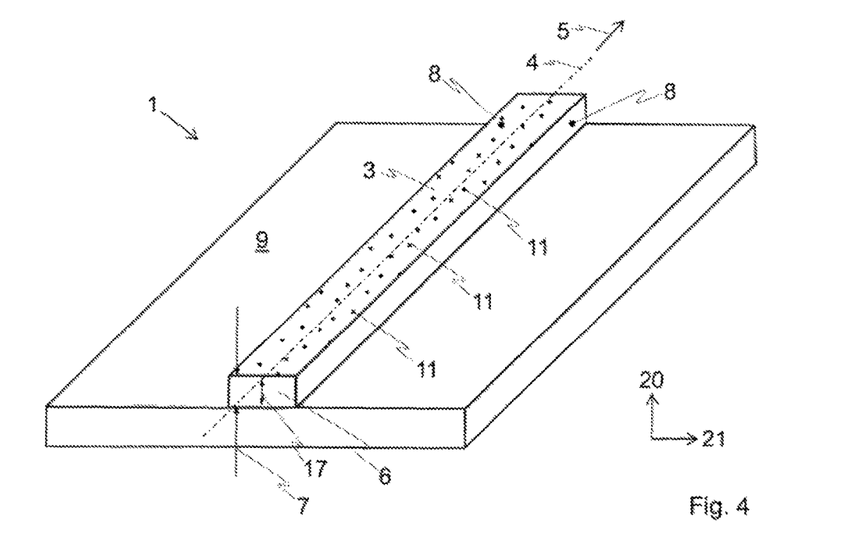
FIG. 4 is a schematic axonometric view of an optical diode according to the invention with foreign atoms as absorber elements.

FIG. 4 shows another embodiment of an optical diode 1 according to the invention. In this case foreign atoms in the waveguide core 2 are used as absorber elements. In the example shown this is an Si waveguide core 3, and doping atoms 11, for example boron atoms, are used as foreign atoms. They are disposed in the region of surface 10 on one side of the waveguide core 3. Correspondingly, it is of less importance to recess the waveguide core 3 in substrate 9, which can be, for example, an $SiO_2$ substrate. Therefore, the waveguide core 3 is disposed only on the substrate 9.

The main polarization component 17 of the light guided in waveguide core 3 runs parallel to the vertical direction 20. Correspondingly, the doping atoms 11 are disposed near a surface 8 of the waveguide core 3, //which is stretched from the lengthwise axis 4 and the width direction 21.

Independent thereof, the smallest lateral dimension 7 of the waveguide core 3 is in turn determined by the dimension of the cross section 6 along the vertical direction 20.

By the doping atoms 11 being disposed in waveguide core 3, they are necessarily in the near field. In each case according to whether the light in waveguide 3 propagates in the indicated direction of propagation or in the opposite direction, an opposite circular polarization of the light at the site of the doping atoms 11 occurs. Correspondingly, the doping atoms absorb the light with different strength depending on its direction of propagation.

By varying the number of absorber elements or doping atoms 11 the degree of absorption of the optical diode 1 in the blocking direction can be varied.

For example, an absorption of 0.0003% can be assumed for a single boron atom for light having a vacuum wavelength $\lambda_0$ of 920 nm at an absorption bandwidth of 1 nm. Thus around $1.5 \times 10^6$ boron atoms are necessary for an absorption of 99% in the blocking direction in this example. If the boron atoms are distributed on a portion of the surface 8 having an edge length of 100 nm and an average boron atom spacing of 5 nm, one needs in this case a waveguide core 3 that is 1.5 mm long. However, if one, more or realistically, assumes a three-dimensional distribution of the boron atoms, the said length decreases further by, for example, a factor of 10, if the boron atoms are distributed in 10 atomic layers on top of each other in waveguide core 3 close to the surface 8. Therefore, in the latter case one would provide doping atoms only on a length of the waveguide core 3 of 150 μm.

Figure 5:
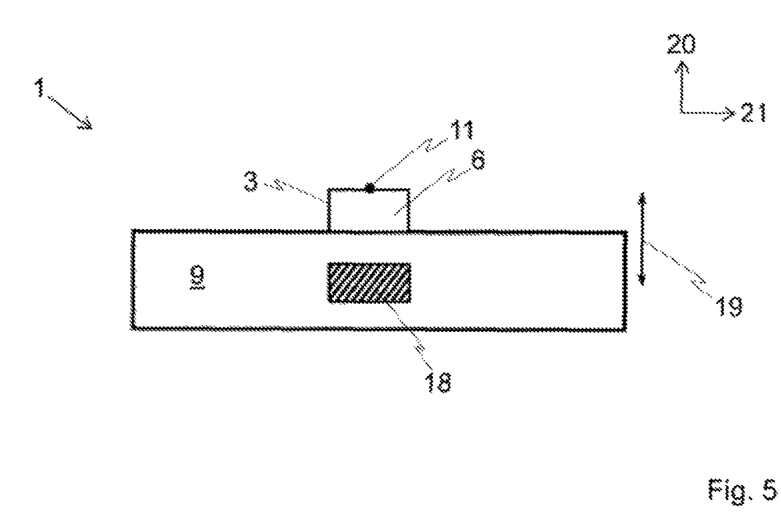
FIG. 5 is a sectional view of an optical diode according to FIG. 4, where an electric conductor track is additionally provided.

In order to be able to dynamically adjust the optical diode 1 for light having different vacuum wavelengths $\lambda_0$ and/or to be able to vary the bandwidth of optical diode 1, the quantum dots 10 and/or the foreign atoms can be exposed to magnetic fields and/or electric fields. FIG. 5 illustrates this by means of the embodiment example from FIG. 4. Here an electric conductor 18 is disposed in substrate 9 under the waveguide core 3. By passing current through the conductor 18, a magnetic field can be generated at the location of the doping atoms. It can be dynamically adjusted by varying the current.

Because of the small distance 19 between the conductor 18 and the doping atoms 11 high magnetic fields can already be generated at the site of the doping atoms with moderate currents. In the embodiment example shown the distance 19 can be, for example, about 1 μm. However, too tight a spacing 19 can have a negative effect on the conduction of the light in the waveguide, since the conductor track 18 in general has a much higher refractive index than the waveguide core 3. The distance 19 therefore should preferably be at least greater than or equal to 200 nm, especially preferably greater than or equal to 300 nm.

Of course, in a completely analogous way permanent magnets can also be disposed in or on the substrate 9 alternatively or in addition to conductor track 18, even though constant magnetic fields can be generated with them.

Figure 6:
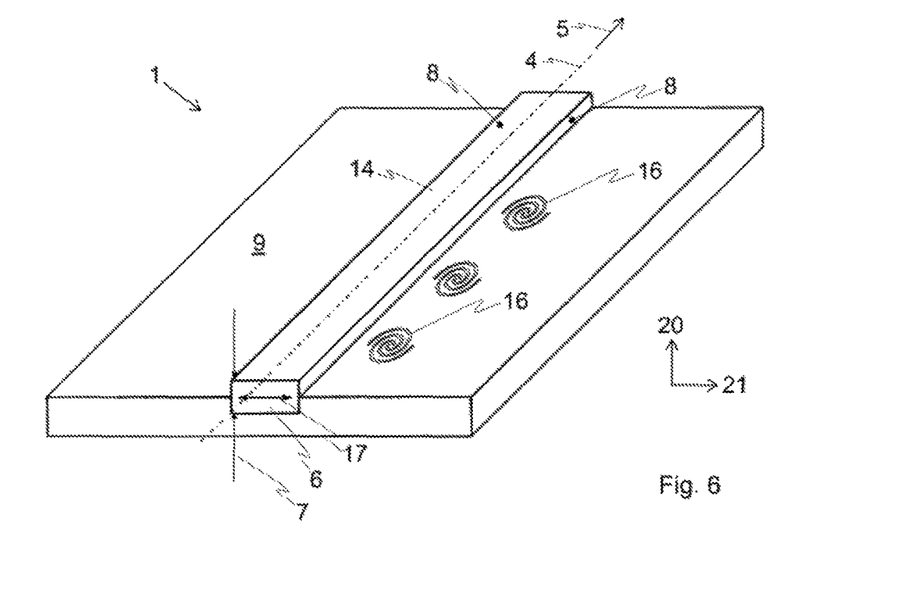
FIG. 6 is a schematic axonometric view of an optical diode according to the invention with plasmonic nanostructures as absorber elements.

Finally, FIG. 6 shows another embodiment of the diode 1 according to the invention, which is made completely analogously to the embodiment of FIG. 3, due to which one is basically referred to the description for FIG. 3. However, in contrast to FIG. 3, plasmonic nanostructures 16 are provided as absorber elements instead of the quantum dots 10. These plasmonic nanostructures 16 are made of metal, preferably gold, and are dimensioned so that their largest dimension is clearly smaller than the vacuum wavelength $\lambda_0$ of the light to be guided in waveguide core 3. For example, a diameter of 30 nm and a height or thickness of 5 nm of the plasmonic nanostructure 16 are conceivable for visible light.

Figure 7:
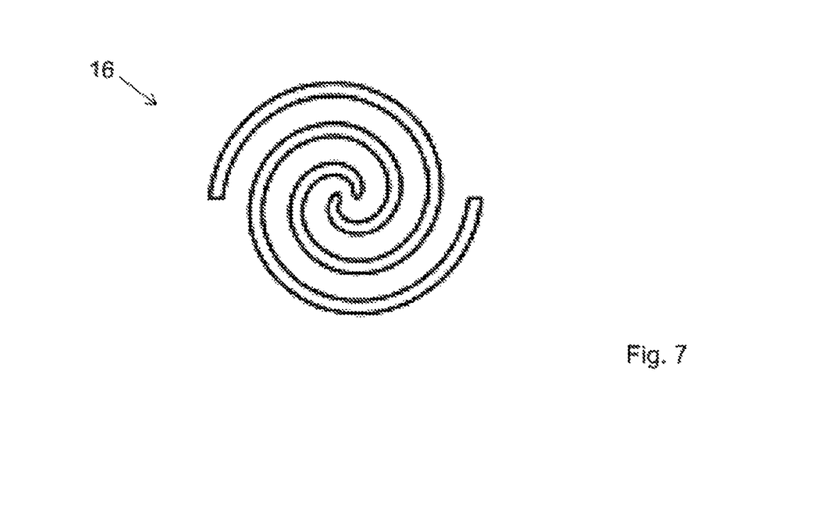
FIG. 7 is a detailed representation of a plasmonic nanostructure from FIG. 6.

FIG. 7 shows a magnified view of a plasmonic nanostructure 16. Here one can readily see that the plasmonic nanostructure is made segmentally in a spiral shape. Specifically, the plasmonic nanostructure 16 that is shown has the shape of two intermeshing spirals. The helicity of these spirals is positive in the representation in FIG. 7, i. e., the spirals in this figure have a positive direction of rotation. This geometric design correspondingly enhances the absorption of the said plasmonic nanostructure 16 for left-circularly polarized light.

REFERENCE NUMBER LIST

1 Optical diode
2 GaAs waveguide core
3 Si waveguide core
4 Lengthwise axis of the waveguide
5 Direction of propagation
6 Waveguide cross section
7 Smallest lateral dimension of the waveguide core
8 Waveguide surface
9 Substrate
10 Quantum dot
11 Doping atom
12 Standard distance between the surface and a quantum dot
13 Air
14 Waveguide core
15 σ' absorber
16 Plasmonic nanostructure
17 Main polarization component of light guided in waveguide core
18 Electric conductor
19 Distance between the electric conductor and a doping atom
20 Vertical direction of the waveguide core
21 Width direction of the waveguide core
σ⁻ Left-circular polarization
σ⁺ Right-circular polarization

The invention claimed is:

1. A optical diode comprising an optical waveguide for conducting light, preferably a light mode, having a vacuum wavelength $\lambda_0$, where the optical waveguide has a waveguide core having a first refractive index $n_1$ and the waveguide core is surrounded by at least one second optical medium, which has at least one second refractive index $n_2$, where $n_1 > n_2$, where the waveguide core has, at least in segments, a smallest lateral dimension, which is a smallest dimension of a cross section perpendicular to a direction of propagation of the light in the waveguide core, where the smallest lateral dimension is greater than or equal to $\lambda_0/(5 \cdot n_1)$ and is less than or equal to $20 \cdot \lambda_0/n_1$, where the optical diode additionally comprises at least one absorber element, which is disposed in a near field, where the near field consists of the electromagnetic field of the light of the vacuum wavelength $\lambda_0$ in the waveguide core and outside of the waveguide core up to a standard distance of $5 \cdot \lambda_0$, where the standard distance is measured from a surface of the waveguide core that forms an optical interface and in a direction perpendicular to the surface, wherein the at least one absorber element exhibits a differently strong absorption for the light having the vacuum wavelength $\lambda_0$ when it has left-circular polarization (σ⁻) on the one hand and when it has right-circular polarization (σ⁺), on the other.

2. The optical diode as in claim 1, wherein a plurality of absorber elements is provided.

3. The optical diode as in claim 2, characterized in that foreign atoms are provided in the waveguide core as absorber elements.

4. The optical diode as in claim 3, wherein the waveguide core consists of a semiconductor material and the foreign atoms are doping atoms for the semiconductor material.

5. The optical diode as in claim 4, wherein the optical waveguide consists of silicon.

6. The optical diode as in claim 5, wherein the foreign atoms are boron atoms.

7. The optical diode as in claim 1, wherein the waveguide core is disposed on a substrate.

8. The optical diode as in claim 7, wherein the waveguide core is, at least in segments, recessed in substrate.

9. The optical diode as in claim 1, wherein at least one quantum dot is provided as the at least one absorber element.

10. The optical diode as in claim 9, wherein the at least one quantum dot is disposed outside of the waveguide core.

11. The optical diode as in claim 10, wherein a plurality of quantum dots is provided, where the quantum dots are disposed parallel to the direction of propagation.

12. The optical diode as in claim 9, wherein the plurality of quantum dots comprise quantum dots that have differently strong absorption for light of different wavelength in the case of left-circular polarization (σ⁻) on the one hand and in the case of right-circular polarization (σ⁺) on the other.

13. The optical diode as in claim 12, comprising a resulting interval of wavelengths, in which the differently strong absorption arises, having a width that is greater than 1 nm.

14. The optical diode as in claim 12, comprising a resulting interval of wavelengths, in which the differently strong absorption arises, having a width that is greater than or equal to 10 nm.

15. The optical diode as in claim 12, comprising a resulting interval of wavelengths, in which the differently strong absorption arises, having a width that is greater than or equal to 30 nm.

16. The optical diode as in claim 9, wherein the quantum dot is singly charged.

17. The optical diode as in claim 1, comprising means for generation of at least one magnetic field at the position of the at least one absorber element are provided in order to enhance the difference between the strength of absorption of left-circularly polarized ($\sigma^-$) light of vacuum wavelength $\lambda_0$ by the at least one absorber element and the strength of absorption of right-circularly polarized ($\sigma^+$) light of the vacuum wavelength $\lambda_0$ by the at least one absorber element.

18. The optical diode as in claim 17, wherein the at least one magnetic field is made so that different parts of the plurality of absorber elements are exposed to magnetic fields of different strengths.

19. The optical diode as in claim 17, wherein at least one electric conductor, through which current can be passed to generate the at least one magnetic field, is provided.

20. The optical diode as in claim 19, wherein the at least one electric conductor is disposed at least in segments on and/or in the substrate.

21. The optical diode as in claim 17, wherein at least one permanent magnet is provided in order to generate the at least one magnetic field.

22. The optical diode as in claim 21, wherein the at least one permanent magnet is disposed at least in segments on and/or in the substrate.

23. The optical diode as in claim 17, wherein the at least one magnetic field is a so-called imaginary magnetic field, where light having a vacuum wavelength $\lambda'$ that is being guided in the optical waveguide is provided for generation of the imaginary magnetic field, where $\lambda' \neq \lambda_0$ and the at least one absorber element is disposed in another near field, which the another near field consists of the electromagnetic field of the light of vacuum wavelength $\lambda'$ in the waveguide core and outside the waveguide core up to a standard distance of $5 \cdot \lambda'$.

24. The optical diode as in claim 17, wherein the at least one magnetic field is variable at the position of at least one absorber element and amounts to at least 1 T.

25. The optical diode as in claim 17, wherein the at least one magnetic field is variable at the position of at least one absorber element and amounts to at least 3 T.

26. The optical diode as in claim 17, wherein the at least one magnetic field is variable at the position of at least one absorber element and amounts to at least 5 T.

27. The optical diode as in claim 1, comprising means for generation of at least one electric field at the position of the at least one absorber element are provided in order to change the value of the wavelength $\lambda$ at which the at least one absorber element absorbs left-circularly polarized ($\sigma^-$) light and right right-circularly polarized ($\sigma^+$) light with different strength.

28. The optical diode according to claim 27, wherein the at least one electric field is variable at the position of at least one absorber element.

29. The optical diode as in claim 1, wherein at least one plasmonic nanostructure, the greatest dimension of which is smaller than the vacuum wavelength $\lambda_0$ of the light guided in the optical waveguide, is provided as absorber element.

30. The optical diode as in claim 29 wherein the at least one plasmonic nanostructure is made of metal.

31. The optical diode as in claim 29, wherein the at least one plasmonic nanostructure has, at least in segments, the shape of a spiral.

32. The optical diode as in claim 29 wherein the at least one plasmonic nanostructure is made of gold.

33. The optical diode as in claim 1, wherein the optical diode is laid out so that the optical diode is essentially transparent for light having vacuum wavelength $\lambda_0$ in a preset direction of propagation and in a direction opposite the direction of propagation absorbs at least 50% of the optical power of the light having vacuum wavelength $\lambda_0$.

34. An integrated optical circuit comprising an optical diode as in claim 1.

35. The optical diode as in claim 1, wherein the optical diode is laid out so that the optical diode is essentially transparent for light having vacuum wavelength $\lambda_0$ in a preset direction of propagation and in a direction opposite the direction of propagation absorbs at least 75% of the optical power of the light having vacuum wavelength $\lambda_0$.

36. The optical diode as in claim 1, wherein the optical diode is laid out so that the optical diode is essentially transparent for light having vacuum wavelength $\lambda_0$ in a preset direction of propagation and in a direction opposite the direction of propagation absorbs at least 90% of the optical power of the light having vacuum wavelength $\lambda_0$.

37. The optical diode as in claim 1, wherein the optical diode is laid out so that the optical diode is essentially transparent for light having vacuum wavelength $\lambda_0$ in a preset direction of propagation and in a direction opposite the direction of propagation absorbs at least 99% of the optical power of the light having vacuum wavelength $\lambda_0$.

* * * * *